United States Patent

[11] 3,625,314

| [72] | Inventor | Kurt H. Rinker<br>Wayne, Mich. |
|---|---|---|
| [21] | Appl. No. | 836,794 |
| [22] | Filed | June 26, 1969 |
| [45] | Patented | Dec. 7, 1971 |
| [73] | Assignee | Kelsey-Hayes Company |

[54] SLIDING CALIPER-TYPE DISK BRAKE
14 Claims, 24 Drawing Figs.

[52] U.S. Cl. .................................................. 188/72.4,
188/73.3, 188/73.5, 188/205 A
[51] Int. Cl. ........................................................ F16d 55/18
[50] Field of Search ............................................ 188/72.4,
73.3, 73.4, 73.5, 73.6, 205 A

[56] References Cited
UNITED STATES PATENTS

| 3,035,664 | 5/1962 | Desvignes et al. | 188/73.3 X |
| 3,166,159 | 1/1965 | Burnett | 188/73.3 |
| 3,265,160 | 8/1966 | Elberg et al. | 188/73.6 |
| 3,310,135 | 3/1967 | Wells | 188/73.6 |
| 3,414,090 | 12/1968 | Hambling | 188/73.3 |
| 3,493,084 | 2/1970 | Maurice | 188/205.3 X |

FOREIGN PATENTS

| 1,373,760 | 8/1964 | France | 188/73.3 |

*Primary Examiner*—George E. A. Halvosa
*Attorney*—Harness, Dickey & Pierce

ABSTRACT: A sliding caliper-type disk brake embodying a torque member having a pair of spaced arms each of which takes the force from a respective one of the brake pads upon their engagement with the associated disk. The caliper is also slidably supported upon the torque member arms but takes substantially no force from the brake pads. Several embodiments of antirattle devices are provided for interposition between the torque member arms and the caliper for accommodating some movement of the caliper while precluding rattling thereof.

SLIDING CALIPER-TYPE DISK BRAKE

BACKGROUND OF THE INVENTION

This invention relates to a disk-type brake and more particularly to several improvements in such brakes.

In disk brake assemblies, the brake pads, when they are brought into frictional contact with the associated disk, must be held against rotation in some manner. That is, the frictional force exerted upon the brake pads must be transmitted from the brake pads to a stationary member. If this force is transmitted from either one or both of the brake pads to the actuating caliper assembly and then to an associated stationary member, the caliper assembly has a tendency to twist due to the necessary production clearances between the caliper and the stationary member and due to inherent deflection of the stationary member. The resultant twisting of the caliper will cause uneven lining wear. In many instances, this type of torque-taking arrangement may add unnecessary weight to the caliper assembly. It has, therefore, been proposed to transmit the force from the brake pads directly to a fixed torque-taking member. Again, however, it is desirable if the torque-taking member can be maintained light in weight since it forms a portion of the unsprung mass.

It is, therefore, a principal object of this invention to provide a brake arrangement wherein the braking force is transmitted from the brake pads to a fixed torque-taking member in such a way as to distribute the loading upon the torque-taking member and accordingly, permit a reduction in its weight.

It is another object of the invention to provide a disk brake assembly wherein the braking force from each of the brake pads is transmitted to a separate torque-taking member.

It is a further object of this invention to provide a disk brake assembly wherein a torque member has a pair of spaced arms and in which each of the brake pads transmits its braking force to a respective one of the arms.

It is a yet further object of the invention to provide a torque-taking arrangement for a disk brake embodying a pair of spaced arms each of which takes the force from one of the brake pads and in which excess loading of one of the arms is effective to transmit a portion of the loading to the other arm.

In one form of disk brake assembly, commonly called the sliding caliper type, the caliper has a pair of spaced legs that straddle the associated disk. Fluid motor means are associated with one of these legs for actuating the associated brake pad and for exerting a reactive force upon the caliper that causes it to slide whereby the other leg will actuate the associated brake pad. In order to have this type of disk brake operate efficiently and smoothly, the caliper should be accurately guided for its movement. However, some clearance is necessary to permit the free sliding movement and this clearance can result in rattling of the caliper relative to its sliding support. In addition, the caliper sliding support should be designed in such a way that it is not prone to the accumulation of dirt or corrosion that would interfere with the sliding movement of the caliper.

It is, therefore, another object of the invention to provide an improved sliding caliper-type disk brake.

It is a further object of the invention to provide an improved antirattle arrangement for a sliding caliper disk brake.

SUMMARY OF THE INVENTION

A first feature of the invention is adapted to be embodied in a disk brake assembly for braking the rotation of an associated disk. Such a brake assembly comprises first and second brake pads adapted to be disposed on opposite sides of the disk. Actuating means are provided for bringing the brake pads into frictional engagement with the respective sides of the associated disk. A first torque reaction member adapted to be fixed against rotation with respect to the disk has means engageable with means on the first brake pad upon engagement of the first brake pad with the disk for holding the first brake pad against rotation and for absorbing the frictional force exerted on the first brake pad. A second torque reaction member is adapted to be fixed against rotation relative to the disk and has means that is engageable with means on the second brake pad upon engagement of the second brake pad with the disk for holding the second brake pad against rotation and for absorbing the frictional force exerted on the second brake pad. The area of engagement of the first brake pad with the first torque reaction member lies on the opposite side of a radial plane containing the axis of rotation of the disk from the area of engagement with the second brake pad of the second torque reaction member.

A second feature of the invention is also adapted to be embodied in a disk brake assembly that includes a brake pad and actuating means for bringing the brake pad into frictional engagement with an associated brake disk. First and second spaced torque reaction arms are provided with abutment means on the first torque arm and the brake pad adapted to engage upon movement of the brake pad into frictional engagement with an associated brake disk. The brake pad is normally ineffective to transmit any substantial braking force to the second torque reaction arm upon its engagement with the disk. Means are provided for transmitting a portion of the braking force from the brake pad to the second torque reaction arm upon a predetermined deflection of the first torque reaction arm for limiting the loading upon the first torque reaction arm.

Still another feature of the invention is adapted to be embodied in a sliding caliper-type brake. In such a brake, the supporting member and the caliper define a pair of respective angularly related surfaces which are juxtaposed to each other. Resilient means are interposed between each of the surfaces for holding the caliper against rattling to the supporting member.

BRIEF DESCRIPTION OF THE DRAWINGS

FIG. 23 is a cross-sectional view showing a yet further embodiment incorporating an antirattle sliding caliper support.

FIG. 24 is a perspective view of the holddown antirattle spring of the embodiment shown in FIG. 23.

DETAILED DESCRIPTION OF THE PREFERRED EMBODIMENTS

Referring first to the embodiment of FIGS. 1 through 7, a disk brake assembly embodying the invention is identified generally by the reference numeral 31. The brake assembly 31 is adapted to coact with a ventilated-type rotor 32 that has a pair of oppositely disposed braking surfaces 33 and 34 and which is affixed for rotation with a hub 35 by means of studs 36. The hub 35 is, in turn, rotatably supported upon a wheel spindle 37 by means including antifriction bearings 38. The wheel spindle 37 is, in turn, suitably supported relative to the associated vehicle and may be dirigible in any known manner. A wheel 39 is also carried by the studs 36 and is held in place by nuts 41.

The disk brake assembly 31 is comprised of a caliper assembly, indicated generally by the reference numeral 42. The caliper assembly 42 defines a pair of spaced legs 43 and 44 that are interconnected by intermediate portion 45. The leg 43 is juxtaposed to the disk braking surface 33 while the leg 44 is juxtaposed to the braking surface 34.

A first brake pad 46 is disposed between the caliper leg 43 and the disk braking surface 33. The brake pad 46 is comprised of a backing plate 47 and a frictional lining 48 that is affixed to the backing plate 47 in any known manner, as by bonding. The frictional lining 48 is in light rubbing contact with the disk braking surfaces 33 and is adapted to be brought into tight frictional engagement with the disk surface 33 by means of a fluid motor contained within the caliper leg 43 and including a piston 49. The fluid motor is actuated by means of a master cylinder that delivers fluid to the fluid motor by means including a brakeline 51 in a known manner.

A second brake pad, indicated generally by the reference numeral 52, is disposed between the caliper leg 44, which may be considered as the reactive leg of the caliper, and the disk braking surface 34. As will become more apparent as this description proceeds, the caliper assembly 42 is supported for sliding movement upon actuation of the fluid motor piston 49. Upon this sliding movement, the caliper leg 44 through its engagement with the brake pad 52 urges it into tight frictional engagement with the disk braking surface 34.

Figure 1:
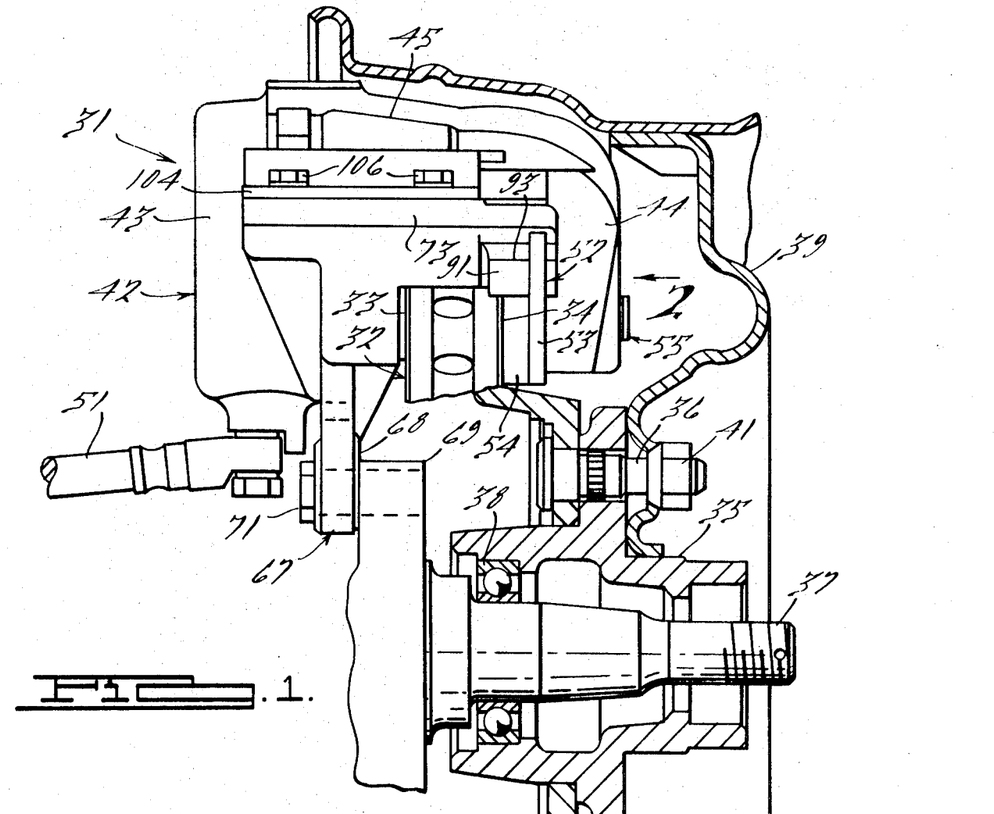
FIG. 1 is a side elevational view, with portions broken away, of a vehicular wheel and associated brake assembly.
Figure 2:
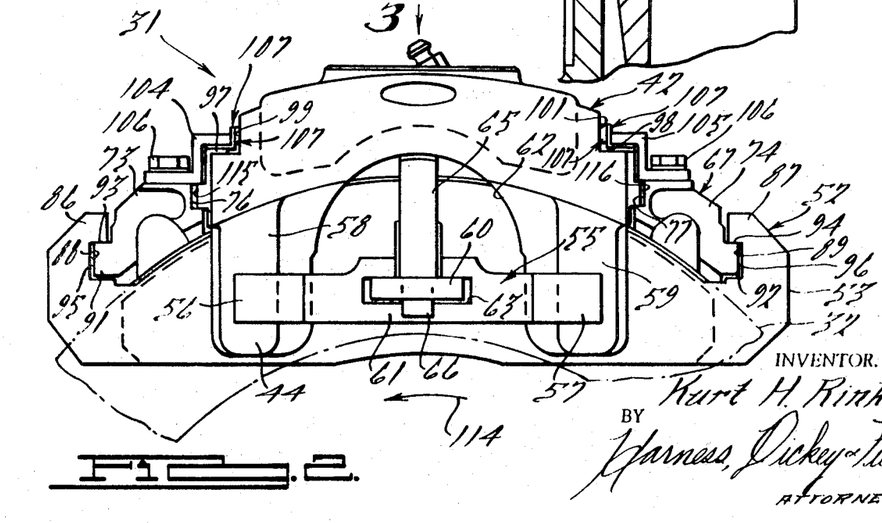
FIG. 2 is an end elevational view taken in the direction of the arrow 2 in FIG. 1.
Figure 3:
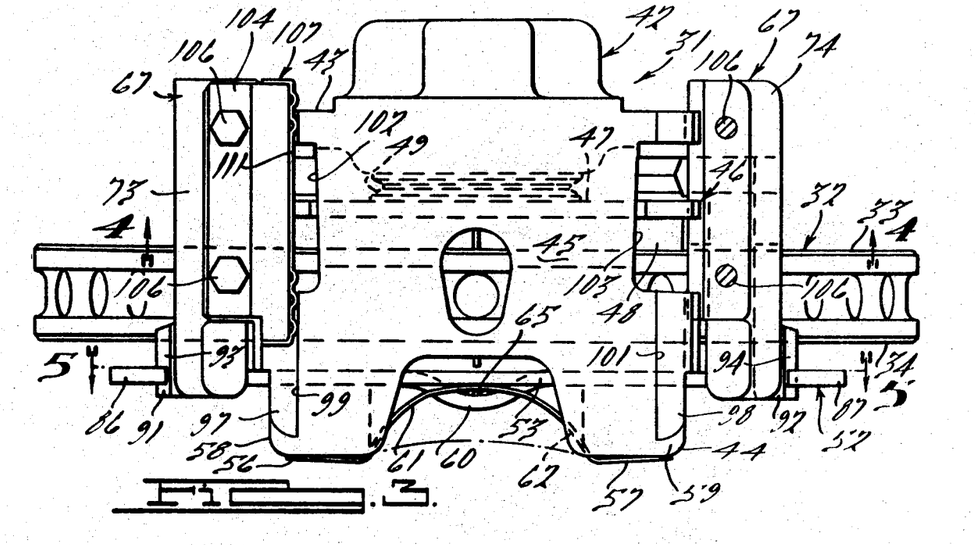
FIG. 3 is a top plan view, with a portion of the caliper broken away, taken in the direction of the arrow 3 in FIG. 2.

The brake pad 52 is comprised of a backing plate 53 and a frictional lining 54 that is affixed to the backing plate 53 in any known manner, as by bonding. Adjacent its central portion, the backing plate 53 is formed with a stuck out portion 60 (FIGS. 2 and 3). A leaf spring 55 has a pair of spaced ends 56 and 57 that engage respective portions 58 and 59 of the caliper leg 44 and an intermediate portion 61 that extends into an opening 62 formed between the portions 58 and 59. The intermediate spring portion 61 is slotted, as at 63, so as to pass the backing plate projection 60. A keeper member 65 has a downwardly extending tang 66 that extends through the backing plate projection 60 and overlies the spring intermediate portion 61 for holding the brake pad 52 in assembled relationship relative to the caliper assembly 42.

A torque reaction member, indicated generally by the reference numeral 67, has a depending portion in which an apertured boss 68 is formed for affixing the torque reaction member 67 to a stationary portion of the vehicle, for example, a flange 69 of the wheel spindle 37 as by means of a bolt 71. Another apertured boss 72 is formed on the torque reaction member depending portion for connection to any appropriate stationary portion of the vehicle. The torque reaction member 67 has a pair of outwardly extending, generally inverted channel-shaped arms 73 and 74. The arms 73 and 74 extend in a generally axial direction with respect to the disk 32 and overlie its outer periphery.

Figure 4:
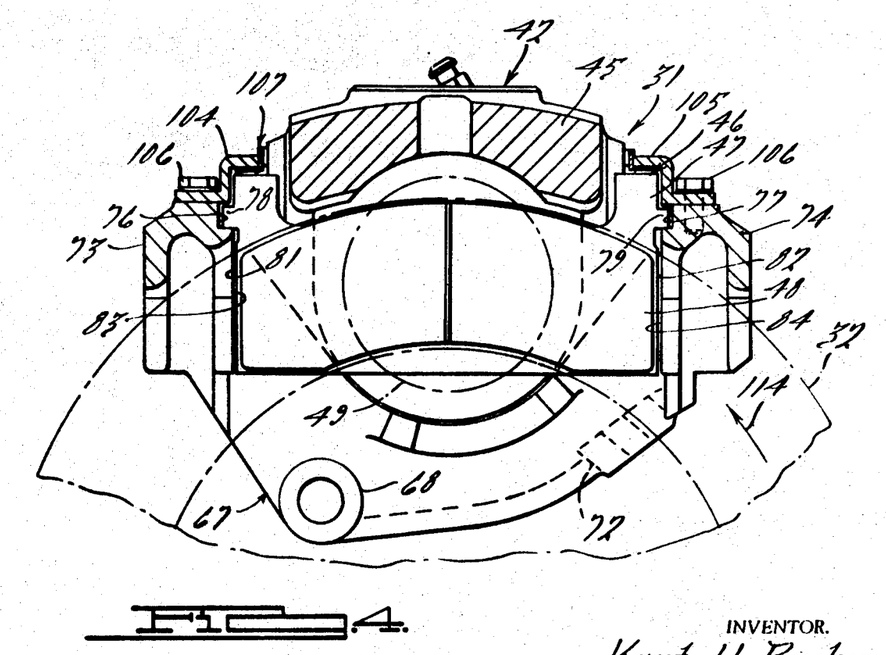
FIG. 4 is a cross-sectional view taken along the line 4—4 of FIG. 3.

The arms 73 and 74 define a gap through which a portion of the caliper assembly 42, and more particularly its intermediate portion 45, extends. On either side of this gap, the torque reaction member legs 73 and 74 are formed with respective grooves 76 and 77 (FIG. 4). The backing plate 47 of the brake pad 46 has outwardly extending tangs 78 and 79 that are received in the grooves 76 and 77, respectively, and which are slidably supported upon the horizontal surfaces of the grooves 76 and 77. The outer peripheral edges of the tangs 78 and 79 are spaced from the vertically extending surface of the grooves 76 and 77, and this spacing is greater than the distance between the immediately adjacent edge surfaces 81 and 82 of the backing plate 47 and the adjacent surfaces 83 and 84 of the torque reaction member legs 73 and 74. Hence, when the brake pad 46 moves in frictional engagement with the disk braking surface 33, one of the backing plate edges 81 or 82 will be brought into abutting relationship with the adjacent surfaces 83 or 84 of the torque reaction member 67, and particularly with one of two legs 73 or 74 for absorbing the torque reaction upon the brake pad 46. Which of these surfaces actually engage will depend upon the direction of rotation of the associated disk 32, as will become more apparent as this description proceeds.

Figure 5:
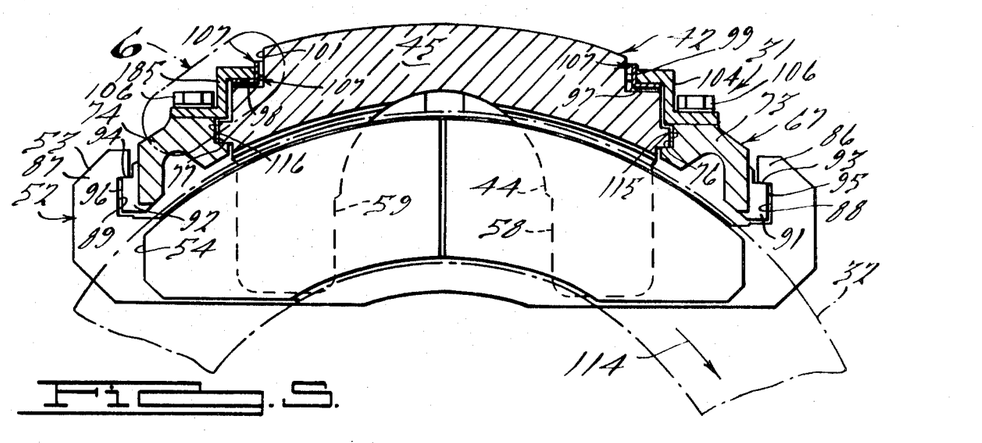
FIG. 5 is a cross-sectional view taken along the line 5—5 of FIG. 3.
Figure 6:
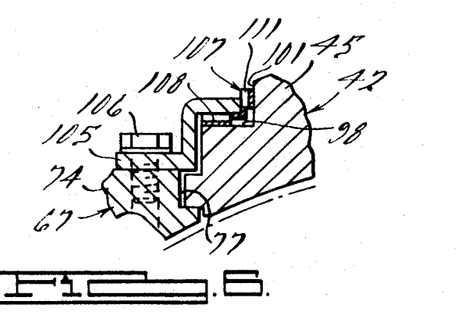
FIG. 6 is an enlarged view of the area encompassed by the circle 6 in FIG. 5 and shows the antirattle support for the caliper.

The backing plate 53 of the second brake pad 52 has upwardly extending portions 86 and 87 in which notches 88 and 89 are formed (FIGS. 2 and 5). The notches 88 and 89 receive outwardly extending portions 91 and 92 of the torque reactive member legs 73 and 74, respectively. The portions 91 and 92 have horizontally disposed surfaces 93 and 94, upon which the backing plate portions 86 and 87 are slidably supported. In addition, vertically extending surfaces 95 and 96 are formed by the portions 91 and 92 and are spaced closely adjacent like surfaces formed by the backing plate notches 88 and 89. When the brake pad 52 is engaged with the disk 32, the surface of one of the backing plate portions 86 and 87 will engage the respective surface 95 and 96 of the respective disk reaction member arm 73 and 74, depending upon the direction of rotation, as will become more apparent as this description proceeds.

Figure 7:
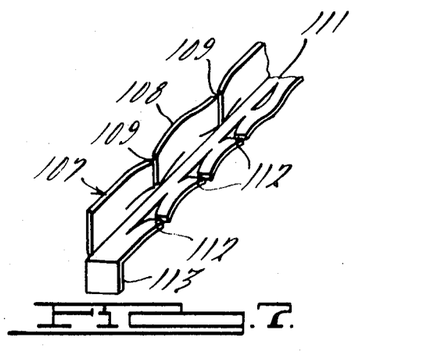
FIG. 7 is a further enlarged perspective view of the antirattle spring.

The caliper assembly intermediate portion 45 is formed with machined horizontal surfaces 97 and 98 adjacent the reaction member arms 73 and 74, which surfaces terminate adjacent machined vertically extending surfaces 99 and 101. The surfaces 97, 98 and 99, 101 are interrupted by cutout portions 102 and 103 of the caliper intermediate portion 45. Generally Z-shaped clamping members 104 and 105 have one of their legs affixed to a respective one of the torque reaction arms 73 and 74 as by bolts 106. The other parallel legs of the clamping members 104 and 105 overlie the respective surfaces 97 and 98 of the caliper assembly 42. These clamping members 104 and 105 are sufficiently long to span the cutouts 102 and 103. It should be noted that the clamping members 104 and 105 do not, however, directly contact the caliper assembly 42. Rather, antirattle springs 107, which springs are shown in detail in perspective view in FIG. 7, are interposed between the clamping members 104 and 105 and the caliper assembly 42. The antirattle springs 107 are generally angularly shaped and have a first leg 108 that is adapted to be interposed between the underside of the respective clamping member and the caliper surface 97 or 98. The leg 108 is slotted at spaced locations, as at 109, and is curved between these slotted portions to form resilient springlike fingers that are compressed slightly between the clamping members 104, 105 and the caliper surfaces 97, 98. A leg 111 is interconnected to the leg 108 and is also slotted at spaced locations, as at 112, to form curved springlike fingers that are lightly compressed between the inner ends of clamping members 104 and 105 and the caliper surfaces 99, 101. The leg 111 is also formed with offset portions 113 at each of its ends that encircle the clamping members 104, 105, to axially affix the springs 107 relative to the respective clamping member. The springs 107 hold the caliper assembly 42 against rattling, but do not interfere with its sliding movement when the piston 49 is actuated and released.

In operation, assuming that the disk 32 is rotating in the direction of the arrows 114 in FIGS. 2, 4, and 5, the piston 49 is actuated in a known manner. The piston 49 urges the brake pad 46 into engagement with the disk braking surface 33. A reactive force will then be exerted upon the caliper assembly 42, tending it to shift to the left as viewed in FIG. 1, so that the brake pad 52 is urged into engagement with the disk braking surface 34 by the caliper reactive leg 44. The caliper assembly 42 is guided for this sliding movement by the antirattle springs 107. When the brake pad 46 engages the rotating disk 32, it also will tend to rotate in the direction of the arrow 114. The initial movement will cause its backing plate edge 81 to engage the surface 83 of the reactive member arm 73 holding it against further rotation. A slight force transfer will also occur between the horizontal surface between the backing plate tang 78 and the like surface that defines the notch 76 in the reactive member arm 73. At the same time, the brake pad 52 tends to rotate in the direction of the arrow 114 (FIG. 2). This rotation will continue until the surface of the cutout 89 engages the surface 96 of the reactive member leg 74. Hence, it will be appreciated that the force from the brake pad 46 is transmitted to the torque reaction member 73, and the torque from the brake pad 52 is transmitted to the torque reaction member arm 74. Hence, no one of these arms absorbs all of the braking force and the individual arms may be lighter than if they both took all of the force. It should also be readily apparent that the brake pad 46 will transfer its braking force to the arm 74, and the brake pad 52 will transfer its torque to the arm 73 if the disk 32 is rotated in a direction opposite to that indicated by the arrow 114. It will be noted that none of the braking torque is transmitted to the caliper assembly 42 under the aforedescribed conditions.

It should be noted that the arrangement of the arms 73 and 74 disposed adjacent the caliper leg 43 permits a wider area of contact between these arms and the backing plate 47. Since the arms 73 and 74 are cut away in the area where they extend across the disk 32 and are mounted in a cantilevered fashion, a greater stress will be exerted upon the arms by the brake pad 52 than by the brake pad 46. In order to further distribute the loading of the arms, a structure is provided whereby excessive loading of one of the arms 73 or 74 by the brake pad 52 will cause part of the load to be transmitted to the other arm.

This force transfer can be best understood by reference to FIG. 2. The caliper leg 44 has outwardly extending projections that define vertically extending surfaces 115 and 116 that are spaced from the vertically extending surfaces that define the notches 76 and 77 in the reactive arms 73 and 74. The spacing between these surfaces determines the amount of deflection allowed by one arm before the following described force transfer takes place. If the force loading from the backing plate 53 to the arm 74 (again assuming that the disk 32 is rotating in the direction of the arrow 114) is sufficient to cause deflection of the arm 74 to bring its surface 77 into engagement with the caliper surface 116, the caliper will shift until its surface 115 engages the surface 76 of the arm 73. Hence, a portion of the brake force on the brake pad 52 will now be transferred to both of the arms 73 and 74. Thus, further lightening of the arms 73 and 74 is permitted, particularly in the area where they overhang the disk 32.

In the described embodiment, the caliper is used as a force transmitter for transmitting a portion of the force on the brake pad 52 from one arm to the other. It is to be understood that various other arrangements may be used for accomplishing this force transfer. For example, the shoe 46 could be used as the force transmitting medium if the clearances were properly selected and if the arms 73 and 74 were sufficiently resilient adjacent the pad 46.

When the brake pads 46 and 52 are released, they will be again returned into light rubbing contact with the disk braking surfaces 33 and 34 in a known manner. For example, the seal associated with the piston 49 may be of the type that exerts a restoring force on the piston. The springs 107 do not interfere with the sliding movement of the caliper assembly 42 but do prevent it from rattling in either a radial direction or a circumferential direction.

In order to remove and replace the brake pads 46 and 52, the clamps 104 and 105 are removed and the caliper assembly 42 is slid radially outwardly away from the disk 22. The pads can then be replaced conveniently and the caliper assembly 42 reassembled.

Various other arrangements may be employed for holding the caliper assembly 42 in an antirattling condition relative to the torque reaction member 67. The remaining figures show several such embodiments and in these figures only the supporting arrangement and antirattle device have been shown in detail. It may be assured that, except as noted, the remainder of the brake assembly is the same as in the previously described embodiment.

Figure 8:
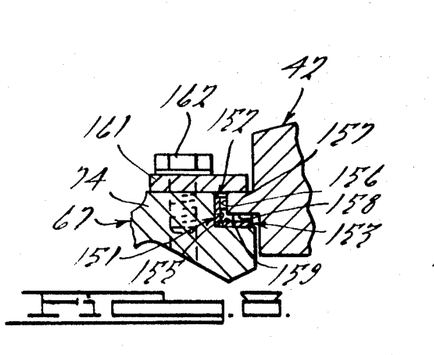
FIG. 8 is a cross-sectional view, in part similar to FIG. 6, showing another embodiment of antirattle arrangement.
Figure 9:
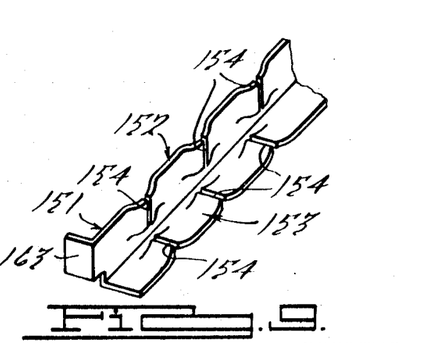
FIG. 9 is an enlarged perspective view of the antirattle spring of the embodiment of FIG. 8.

Considering now the embodiment of FIGS. 8 and 9, an antirattle spring, indicated generally by the reference numeral 151, has a pair of angularly related legs 152 and 153. Each of the legs 152 and 153 is slotted at longitudinally spaced positions as at 154, and is formed with an arcuate resilient portion between the slots 154. The leg 152 is interposed between a generally vertically extending surface 155 of the torque reaction member 67 and a facing surface 156 formed by an outstanding projection 157 of the caliper assembly 42. The leg 153 is interposed between a horizontally extending surface 158 of the caliper projection 157 and a facing surface 159 of the torque reaction member 67. A clamping plate 161 engages the upper side of the caliper projection 157 and is held in place by bolts 162. Hence, the caliper projection 157 is resiliently maintained relative to the torque reaction member 67 but is permitted to slide relative to it by the antirattle spring 151. The spring 151 and particularly its leg 152 is formed with offset portions 163 at each of its ends which portions engage the torque reaction member 67 to locate the spring 151.

Figures 10, 11, 12, 13, 14, 15, 16, 17, 18:
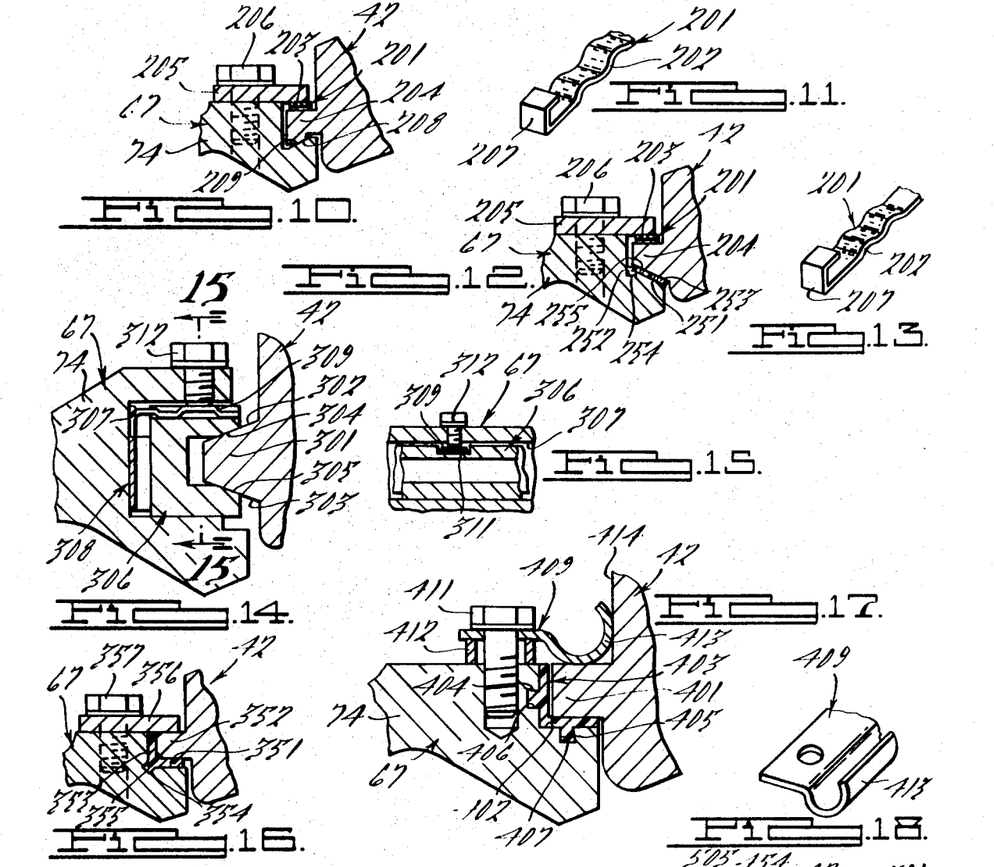
FIG. 10 is a cross-sectional view, in part similar to FIGS. 6 and 8, and shows another embodiment of a sliding support for the caliper embodying an antirattle feature.
FIG. 11 is an enlarged perspective view of the antirattle spring used in the embodiment of FIG. 10.
FIG. 12 is a cross-sectional view, in part similar to FIGS. 6, 8 and 10, showing another embodiment of a sliding caliper support embodying an antirattle feature.
FIG. 13 is an enlarged perspective view of the antirattle spring used in the embodiment of FIG. 12.
FIG. 14 is an enlarged cross-sectional view, in part similar to FIGS. 6, 8, 10 and 12, showing a still further embodiment of a sliding support for the caliper embodying an antirattle feature.
FIG. 15 is a reduced scale cross-sectional view taken along the line 15—15 of FIG. 14.
FIG. 16 is a cross-sectional view, in part similar to FIGS. 6, 8, 10, 12 and 14, showing another embodiment of an antirattle sliding caliper support.
FIG. 17 is an enlarged cross-sectional view, in part similar to the preceding embodiments, showing yet another antirattle sliding caliper support.
FIG. 18 is a perspective view of the holddown spring of the embodiment shown in FIG. 17.

FIGS. 10 and 11 show another embodiment which, unlike the previous embodiments, embodies antirattle springs that do not have angularly disposed legs. The antirattle springs of this embodiment, indicated generally by the reference numeral 201, have a generally corrugated leg portion 202 that is interposed between a horizontally extending surface 203 of a projection 204 of the caliper assembly 42 and a holddown plate 205. The holddown plate 205 is affixed to the torque reaction member 67 as by bolts 206. Opposite ends of the spring 201 have channel-shaped portions 207 that receive the opposite edges of the plate 205 to hold the spring 201 in assembled relationship to the plate 205.

The underside of the caliper projection 204 is formed with an angularly disposed surface 208 that is urged into a complementary surface 209 of the torque reaction member 67 by the spring 201. The wedging action occurs between the surfaces 208 and 209 due to the resiliency of the compressed spring 201 for holding the caliper 42 resiliently against both radial (vertical) and circumferential (horizontal) movement.

The embodiment of FIGS. 12 and 13 is substantially similar to the embodiment of FIGS. 10 and 11 in that it uses the same type of holddown spring arrangement and like parts in this embodiment have been identified by like reference numerals and will not be described again. In this embodiment, an angularly related surface 251 of the caliper assembly projection 204 is disposed adjacent a surface 252 of the torque reaction member 67. The surfaces 251 and 252 are spaced apart and an anticorrosion member 253, which may be formed from nylon or other similar material, is interposed between these surfaces. The member 253 has an enlarged projection 254 at its end that is received in a groove 255 of the torque reaction member 67 so that it will be held in place. The spring 201 holds the surfaces 251 and 252 in engagement with the anticorrosion member 253 and again serves to hold the caliper assembly 42 in an antirattle relationship relative to the torque reaction member 67.

FIGS. 14 and 15 show another embodiment in which a spring biased wedging arrangement is provided for holding the caliper assembly in an antirattle condition. In this embodiment, the caliper assembly 42 is provided with a projection 301 that has tapered, outwardly converging surfaces 302 and 303. These surfaces are in engagement with complementary surfaces 304 and 305 of a wedging member, indicated generally by the reference numeral 306. The wedging member 306 is contained within a closed groove 307 formed within the torque reaction member 67. A generally L-shaped antirattle spring 308 is also received within the groove 307 and has resilient portions that engage the wedging member 306 for urging it in a generally circumferential direction and for holding it radially inwardly relative to the axis of rotation of the disk. One leg 309 of the antirattle spring 308 is received within a groove 311 of the wedging member 306 and is held in place by one or more bolts 312.

The described assembly permits the aforenoted sliding movement of the caliper assembly 42 but serves to locate it radially and circumferentially. In order to remove the caliper assembly 42, the bolts 312 are removed and the wedging members 306 and associated springs 308 are slid axially free of the torque reaction member 67.

FIG. 16 shows another embodiment in which an open-type groove 351 is formed in the upper surface of the torque reaction member 67. The caliper assembly 42 has an outwardly extending projection 352 that is received within the groove 351. A generally L-shaped antifriction member 353 is interposed between the caliper projection 352 and torque reaction member groove 351. The antifriction member 352 is formed from nylon or a similar material having corrosion resistant properties and having some resilience. A tang 354 of the member 353 extends into a slot 355 of the torque reaction member 67 formed at the base of the groove 352. This coaction holds the antifriction member 353 in place.

A clamping member 356 overlies the caliper projection 352 and is held in place by bolts 357. The plate 356 serves to preload the antifriction member 353 to resiliently hold the caliper assembly 352 in position while permitting its sliding movement.

FIGS. 17 and 18 show an arrangement similar to that shown in FIG. 16. In this embodiment, however, a projection 401 of the caliper assembly 42 extends into a groove 402 of the torque reaction member 67 with an antifriction member 403 interposed therebetween. The antifriction member 403 is also formed from a corrosion resistant material such as nylon and has wedge-shaped projections 404 and 405 that are received in complementary slots 406 and 407 of the reaction member 67. The radially extending leg of the antifriction member 403 is spaced from the complementary surface of the caliper projection 401.

A resilient clamping member, indicated generally by the reference numeral 409, is held relative to the torque reaction member 67 by bolts 411 and spacers 412. The clamping member 409 has a generally arcuate portion 413 that engages the upper side of the caliper projection 401 and a radially extending surface 414 of the caliper assembly. The engagement with the surface 414 resiliently resists circumferential movement and the engagement with the upper surface of the projection 401 urges the caliper assembly into engagement with the antifriction member 403. Hence, an antirattle arrangement is provided that facilitates the sliding movement of the caliper assembly as in the previously described embodiments.

Figures 19, 20, 21, 22:
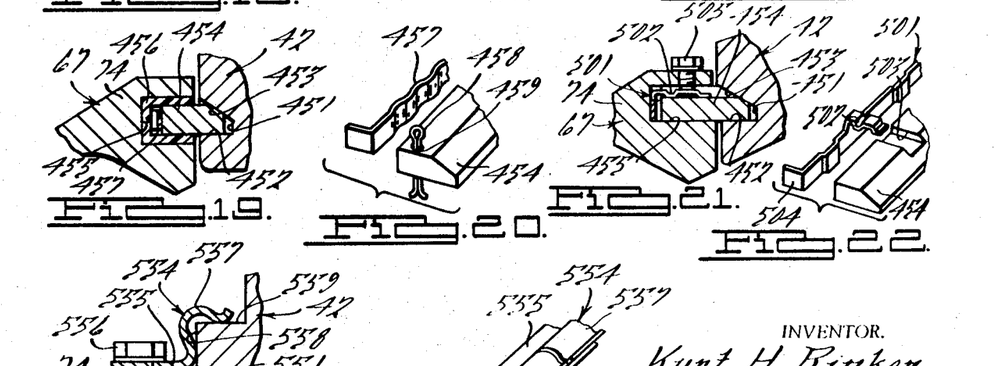
FIG. 19 is a cross-sectional view showing a further embodiment of an antirattle sliding caliper support.
FIG. 20 is an exploded perspective view showing the caliper support wedge and antirattle spring of the embodiment of FIG. 19.
FIG. 21 is a cross-sectional view, in part similar to the previous embodiments, showing a further antirattle sliding caliper support.
FIG. 22 is an exploded perspective view showing the caliper supporting wedge and biasing spring of the embodiment shown in FIG. 21.

FIGS. 19 and 20 show a wedging-type antirattle arrangement. In this embodiment, the caliper assembly 42 is formed with a slot 451 having a horizontally or circumferentially extending surface 452 and an angularly related surface 453. Complementary surfaces of a wedging member 454 engage the caliper surfaces 452 and 453. The wedging member 452 is received within an enlarged, closed slot 455 formed in the torque reaction member 67. A channel-shaped antifriction member 456, that is formed from an antifriction corrosion resisting material such as nylon, is received in the slot 455 and slidably supports the wedging member 454. A corrugated leaf-type antirattle spring 457 is interposed between the base of the antifriction member 457 and the outer end of the wedging member 454 to urge the wedging member surfaces into engagement with the caliper surfaces 452 and 453. The wedging member 454 is held in place by means of cotter keys 458 that extend through apertures 459 at each of its ends and which coact with any suitable member fixed to the torque reaction member 67.

FIGS. 21 and 22 shown an embodiment similar to the embodiment of FIGS. 19 and 20. The caliper slot and wedging member is of the same type as in the previously described embodiment and its description will not be repeated. In this embodiment, however, an antifriction member is not interposed between the torque reaction member groove 455 and the wedging member 454. An L-shaped antirattle spring 501 is received in the groove 455 and has its legs in resilient engagement with the wedging member 454. The uppermost leg 502 is received in a slot 503 formed in the upper surface of the wedging member 454 for holding the wedging member 454 in place. The other leg of the spring 501 is offset at each end, as at 504, to form tabs that engage opposite ends of the torque reaction member 67. A bolt 505 also engages the upper end of the spring leg 502 for holding the parts in assembled relationship.

The embodiment of FIGS. 23 and 24 is similar in some regards to the embodiment of FIGS. 17 and 18 in that a single resilient holddown spring locates the caliper assembly both radially and circumferentially. In this embodiment, the caliper assembly 42 has a projection 551 with a lower surface 552 that rests upon a horizontal surface 553 formed by a notch in the torque reaction member 67. A holddown spring, indicated generally by the reference numeral 554, has a flattened portion 555 that is held to the reaction member 67 adjacent the notch by means of bolts 556. Adjacent the flattened portion 555, the spring 554 has a generally horseshoe-shaped section 557. One leg of this portion engages a radially extending surface 558 of the caliper assembly 42 which surface extends above the projection 551. The other leg of the horseshoe-shaped portion 557 engages a horizontally extending surface 559 of the caliper assembly 42 which surface is adjacent the surface 558. Thus, the horseshoe-shaped portion of the spring 554 both radially and circumferentially locates the caliper assembly 42. The caliper assembly 42 may be conveniently removed through removal of the holddown springs 557.

What is claimed is:

1. A sliding caliper-type disk brake assembly for braking the rotation of an associated disk having oppositely facing braking surfaces, said assembly comprising a fixed torque reaction member having a pair of spaced arms extending across the outer periphery of the disk, a caliper assembly supported for sliding movement upon said arms and therebetween, said caliper assembly having an actuating leg disposed adjacent one of the disk braking surfaces and a reactive leg disposed adjacent the other of the disk braking surfaces, a first brake pad interposed between said actuating leg of said caliper and the one disk braking surface, said first brake pad having a backing plate and a frictional lining material adapted to engage the one disk braking surface, said backing plate having oppositely facing abutment surfaces adapted to engage a respective one of inwardly facing surfaces of said arms upon engagement of said lining with the one disk braking surface, a second brake pad interposed between said reactive leg of said caliper and the other disk braking surface, said second brake pad having a backing plate and a frictional lining adapted to engage the other disk braking surface, said backing plate of said second brake pad having surfaces facing each other adapted to engage outwardly facing surfaces of said arms upon engagement of its lining with the other disk braking surface, and actuating means carried by said caliper actuating leg for urging said first brake pad into engagement with the one disk braking surface and for sliding said caliper for urging of said second brake pad into engagement with the other disk braking surface by said reactive leg.

2. A disk brake assembly including a brake pad, actuating means for bringing said brake pad into frictional engagement with an associated brake disk, first and second spaced torque arms, abutment means on said first torque arm and on said brake pad adapted to engage upon movement of said brake pad into frictional engagement with the associated brake disk, said brake pad normally being ineffective to transmit any substantial braking force to said second torque arm upon engagement with the disk, said first torque arm having a portion thereon which deflects a greater amount than a portion on said second torque arm when said brake pad transmits braking force to said first torque arm, and means for transmitting a portion of the braking torque from said brake pad to said portion of said second torque arm upon a predetermined deflection of said portion of said first torque arm for limiting the loading upon said first torque arm.

3. A disk brake assembly as set forth in claim 2 wherein the means for transmitting a portion of the braking torque from the brake pad to the second torque arm includes the actuating means, the first torque arm being adapted to engage the actuating means upon its predetermined deflection for urging said actuating means against said second torque arm.

4. A disk brake assembly for braking the rotation of an associated disk comprising a first brake pad adapted to be disposed on one side of the disk, a second brake pad adapted be disposed on the other side of the disk, actuating means for bringing said brake pads into frictional engagement with the respective sides of the associated disk, a first torque reaction member adapted to be fixed against movement with respect to the disk, means on said first brake pad engageable on one side of said disk with means on said first torque reaction member upon engagement of said first brake pad with the disk when the disk is rotating in one direction for holding said first brake pad against rotation about the axis of the disk and for absorbing the frictional force exerted upon said first brake pad, a second torque reaction member adapted to be fixed against movement with respect to the disk, and means on said second brake pad engageable on the other side of said disk with means on said second torque reaction member upon engagement of said second brake pad with the disk when the disk is rotating in said one direction for holding said second brake pad against rotation about the axis of said disk and for absorbing the frictional force exerted on said second brake pad, the area of engagement of said first brake pad with said first torque reaction member lying on the opposite side of a radial plane containing the axis of rotation of the disk from the area of engagement of said second brake pad with said second torque reaction member.

5. A disk brake assembly as set forth in claim 4 wherein the first brake pad normally transfers substantially no frictional force to the second torque reaction member and further including means for transferring frictional force from said first brake pad to the second torque reaction member upon a predetermined loading of the first torque reaction member.

6. A disk brake assembly as set forth in claim 4 wherein the actuating means comprises a caliper supported for sliding movement relative to the disk in a direction substantially parallel to the axis of rotation of the disk, said sliding caliper including reactive means in engagement with the second brake pad for actuating the second brake pad upon sliding movement of the caliper and operating means associated with the first brake pad for moving the first brake pad into engagement with the disk and for sliding the caliper.

7. A disk brake assembly as set forth in claim 6 wherein the caliper is supported for sliding movement by the torque reaction members.

8. A disk brake assembly as set forth in claim 7 further including antirattle means interposed between the torque reaction members and the sliding caliper for resiliently holding said caliper against radial and circumferential movement relative to the torque reaction members.

9. A disk brake assembly for braking the rotation of an associated disk having oppositely facing braking surfaces, said brake assembly comprising a first brake pad adapted to frictionally engage one of the disk braking surfaces, a second brake pad adapted to engage the other of the disk braking surfaces, actuating means for bringing said brake pads into frictional engagement with the respective disk braking surfaces, a torque reaction member adapted to be affixed against rotation relative to the associated disk, said torque reaction member having a pair of circumferentially spaced apart arms extending across the periphery of the associated disk, abutment means on said first brake pad adapted to engage a first of said torque reaction member arms on one side of the disk upon engagement of said first brake pad with the disk for holding said first brake pad against rotation about the axis of said disk when the disk is rotating in one direction and abutment means on said second brake pad adapted to engage the second of said torque reaction member arms on the other side of the disk upon engagement of said second brake pad with the disk for holding said second brake pad against rotation about the axis of said disk when the disk is rotating in said one direction.

10. A disk brake assembly as set forth in claim 9 wherein the actuating means comprises a caliper supported for sliding movement relative to the disk in a direction substantially parallel to the axis of rotation of the disk, said sliding caliper including reactive means in engagement with the second brake pad for actuating the second brake pad upon sliding movement of the caliper and operating means associated with the first brake pad for moving the first brake pad into engagement with the disk and for sliding the caliper.

11. A disk brake assembly as set forth in claim 10 wherein the caliper is supported for sliding movement upon the torque reaction member arms.

12. A disk brake assembly as set forth in claim 9 further including second abutment means on said first brake pad adapted to engage the second torque reaction member arm and second abutment means on the second brake pad adapted to engage the first torque reaction member arm upon engagement of said brake pads with the disk when the disk is rotating in a direction opposite to said one direction.

13. A disk brake assembly as set forth in claim 12 wherein the actuating means comprises a caliper supported for sliding movement relative to the disk in a direction substantially parallel to the axis of rotation of the disk and upon the torque reaction member arms, said caliper including reactive means in engagement with the second brake pad for actuating said second brake pad upon sliding movement of said caliper and operating means associated with the first brake pad for moving said first brake pad into engagement with the disk and for sliding said caliper.

14. A disk brake assembly as set forth in claim 13 further including antirattle means interposed between the caliper and the torque reaction member arms for slidably supporting the caliper and for holding the caliper against rattling relative to said torque reaction member arms.

* * * * *

UNITED STATES PATENT OFFICE
CERTIFICATE OF CORRECTION

Patent No. 3,625,314        Dated December 7, 1971

Inventor(s) Kurt H. Rinker

It is certified that error appears in the above-identified patent and that said Letters Patent are hereby corrected as shown below:

Col. 2, line 31, after "rattling" should be --relative--.

Col. 3, line 46, "surfaces" should be --surface--;
      line 65, "stuck" should be --struck--.

Col. 6, line 28, "assured" should be --assumed--.

Signed and sealed this 15th day of May 1973.

(SEAL)
Attest:

EDWARD M. FLETCHER, JR.          ROBERT GOTTSCHALK
Attesting Officer                Commissioner of Patents